Patented Oct. 24, 1939

2,176,958

UNITED STATES PATENT OFFICE 2,176,958

VINYL ACETATE, ETHYLIDINE DIACETATE, AND HOMOLOGOUS ESTERS

Henry Dreyfus, London, England

No Drawing. Application January 3, 1936, Serial No. 57,451. In Great Britain January 28, 1935

10 Claims. (Cl. 260—498)

This invention relates to the production of organic compounds and is more particularly concerned with the production of vinyl acetate, ethylidene diacetate and homologues of these esters.

According to the present invention it has been found that the production of vinyl acetate and ethylidene diacetate, from acetylene and acetic acid, is favorably influenced by the presence of agents which promote oxidations. More particularly it has been found that the addition of such agents to catalysts which assist the process in question enables very satisfactory yields of the esters to be obtained.

As examples of the agents which may be employed in carrying out the process of the present invention may be mentioned higher oxides of metals forming more than one oxide, e. g. manganese dioxide and lead peroxide, salts exerting an oxidising action for instance pyrosulphates, dichromates, permanganates and persulphates and oxygen carriers, such as manganese sulphate. Other agents which may be employed are ferric chloride, potassium or other ferricyanide and silver oxide.

Such agents may be used with a catalyst in any desired proportion, although usually quite small proportions, e. g. 5 to 15%, or less, e. g. 2 to 5%, on the weight of the catalyst give very satisfactory results.

The agent employed, hereinafter referred to as an "oxidation agent", may be incorporated in a suspension of a mercury salt, e. g. mercuric sulphate, in acetic acid and a current of acetylene, if desired in admixture with acetic acid vapor, passed into the suspension. Such a suspension may contain other materials, e. g. acetic anhydride, whether such materials actively assist the process or merely act as diluents.

The process may also be carried out by passing a mixture of acetylene and vaporous acetic acid through a tube or other form of apparatus maintained at a suitable temperature, and containing a catalyst with which the oxidation agent is mixed. As catalysts which may be employed to assist such a process may be mentioned those having hydrating properties, for instance zinc, nickel and ferrous oxides and salts such as the acetates or carbonates of zinc, nickel and iron. Cadmium oxide and salts of cadmium, e. g. cadmium acetate are also very efficacious as catalysts. Such catalysts may be employed in conjunction with filling materials or surface catalysts, such as pumice, kieselguhr, activated charcoal and silica gel. The vapor phase process may be carried out in presence of diluents, for instance inert gases, e. g. hydrogen, carbon dioxide or methane or vapors, e. g. acetic anhydride vapor.

The temperatures employed may be varied within wide limits, for instance 50 to 300° C. according to whether the process is carried out in the liquid or vapor phase. It may be remarked that the use of relatively low temperatures, for instance below 80° C., e. g. 50 to 75° C., favors the production of vinyl acetate rather than ethylidene diacetate. The vapor phase process may be carried out very satisfactorily at temperatures of 150 to 300° C., and particularly at temperatures of 180 to 250° C. As indicated in U. S. Patent No. 2,121,342 a high yield of ethylidene diacetate containing, at the most, only a small proportion of vinyl acetate, may be produced by the use of a greater proportion of acetic acid than that theoretically necessary for the producion of ethylidene diacetate.

The process, whether carried out in the liquid or vapor phase, is preferably effected at atmospheric pressure or increased pressure, but reduced pressure may be employed if desired.

It is to be understood that while the invention has been described more particularly with reference to the production of vinyl acetate and ethylidene diacetate, the invention is not limited in this respect, and may be applied to the production of homologues of these esters by choice of suitable aliphatic acid and acetylene hydrocarbon. For instance, by subjecting acetylene to reaction with propionic acid, vinyl propionate and/or ethylidene dipropionate may be obtained. Likewise by employing allylene instead of acetylene there may be obtained methyl-vinyl esters and/or propylidene esters. Furthermore, the invention includes broadly the production of such esters by carrying out the process described in presence of oxidation agents, whether or not the oxidation agents are employed together with catalysts.

It may be remarked that while the reaction carried out in the process of the present invention produces vinyl acetate and/or ethylidene diacetate, or homologous esters, prolongation of the time during which the reaction product is in the reaction zone leads to decomposition, with the formation of acetic anhydride and acetaldehyde in the case of ethylidene diacetate.

The following examples serve to illustrate the invention, but it is to be understood that these examples are given solely by way of illustration and are not limitative:

Example 1

A current of acetylene is passed into a vessel fitted with a stirrer and containing glacial acetic acid in which is suspended about 12 parts of mercuric sulphate and one part of manganese sulphate per 100 parts of acid and maintained at a temperature of about 70 to 75° C.

The product, part of which is entrained by unabsorbed acetylene and is collected in a receiver connected to a condenser through which the acetylene is passed before being returned to the process, consists chiefly of vinyl acetate together with some ethylidene diacetate. These compounds are separated from each other and from unchanged acetic acid by fractional distillation.

Example 2

Pieces of pumice are soaked in a concentrated aqueous solution of zinc acetate, dried and then sprayed with sufficient of a potassium dichromate solution to deposit 5 to 6 parts of dichromate for each part of zinc acetate on the pumice after which the product is again dried.

A mixture of acetic acid vapor and acetylene in proportions of about 4 molecules of acetic acid to each molecule of acetylene is passed over this catalyst at a temperature of 200 to 210° C.

The ethylidene diacetate produced, which contains at the most only a small proportion of vinyl acetate, may be separated from unchanged acetic acid by fractional condensation.

Having described my invention what I desire to secure by Letters Patent is:

1. Process for the manufacture of at least one compound selected from the group consisting of vinyl esters and ethylidene diesters, which comprises reacting an aliphatic acid with acetylene in presence of a mixture of two different substances, one of these substances being a catalyst for the reaction and having hydrating properties and the other a metal salt which is an oxidation agent, the quantity of metal salt being equal to at least 2% of the weight of said catalyst present.

2. Process for the manufacture of at least one compound selected from the group consisting of vinyl acetate and ethylidene diacetate, which comprises reacting acetic acid with acetylene in presence of a mixture of two different substances, one of these substances being a catalyst for the reaction and having hydrating properties and the other a metal salt which is an oxidation agent, the quantity of metal salt being equal to at least 2% of the weight of said catalyst present.

3. Process for the manufacture of at least one compound selected from the group consisting of vinyl acetate and ethylidene diacetate comprising reacting acetic acid with acetylene in presence of a catalyst, wherein the catalyst is employed in admixture with at least 2% of its weight of a metal salt which is an oxidation agent selected from the group consisting of pyro-sulphates, dichromates, permanganates and persulphates.

4. Process for the manufacture of at least one compound selected from the group consisting of vinyl acetate and ethylidene diacetate, comprising reacting acetic acid with acetylene in presence of a catalyst, wherein the catalyst is employed in admixture with at least 2% of its weight of manganese sulphate.

5. Process for the manufacture of at least one compound selected from the group consisting of vinyl acetate and ethylidene diacetate comprising reacting acetic acid with acetylene in presence of a catalyst, wherein the catalyst is employed in admixture with 2 to 15% of its weight of a metal salt which is an oxidation agent selected from the group consisting of pyro-sulphates, dichromates, permanganates and persulphates.

6. Process for the manufacture of at least one compound selected from the group consisting of vinyl acetate and ethylidene diacetate comprising reacting acetic acid with acetylene in presence of a catalyst, wherein the catalyst is employed in admixture with 2 to 15% of its weight of manganese sulphate.

7. Process for the manufacture of at least one compound selected from the group consisting of vinyl acetate and ethylidene diacetate, comprising reacting acetic acid with acetylene in the liquid phase at temperatures of 50 to 80° C. in presence of a catalyst, wherein the catalyst is employed in admixture with at least 2% of its weight of manganese sulphate.

8. Process for the manufacture of at least one compound selected from the group consisting of vinyl acetate and ethylidene diacetate, comprising reacting acetic acid with acetylene in the liquid phase at temperatures of 50 to 80° C. in presence of a catalyst, wherein the catalyst is employed in admixture with 2 to 15% of its weight of manganese sulphate.

9. Process for the manufacture of at least one compound selected from the group consisting of vinyl acetate and ethylidene diacetate comprising reacting acetic acid with acetylene in the vapor phase at temperatures of 180 to 250° C. in presence of a catalyst, wherein the catalyst is employed in admixture with at least 2% of its weight of a metal salt which is an oxidation agent selected from the group consisting of pyro-sulphates, dichromates, permanganates and persulphates.

10. Process for the manufacture of at least one compound selected from the group consisting of vinyl acetate and ethylidene diacetate comprising reacting acetic acid with actylene in the vapor phase at temperatures of 180 to 250° C. in presence of a catalyst, wherein the catalyst is employed in admixture with 2 to 15% of its weight of a metal salt which is an oxidation agent selected from the group consisting of pyro-sulphates, dichromates, permanganates and persulphates.

HENRY DREYFUS.